(12) United States Patent
Ho et al.

(10) Patent No.: US 11,032,962 B2
(45) Date of Patent: Jun. 15, 2021

(54) DRIVING HEAD OF AN ELECTRIC GARDENING MACHINE

(71) Applicant: Ping-Tzu Ho, Taichung (TW)

(72) Inventors: Ping-Tzu Ho, Taichung (TW); I-Pei Ho, Taichung (TW)

(73) Assignee: Ping-Tzu Ho, Taichung (TW)

(*) Notice: Subject to any disclaimer, the term of this patent is extended or adjusted under 35 U.S.C. 154(b) by 276 days.

(21) Appl. No.: 16/402,852

(22) Filed: May 3, 2019

(65) Prior Publication Data

US 2019/0335647 A1 Nov. 7, 2019

(30) Foreign Application Priority Data

May 4, 2018 (TW) .................................. 107115175

(51) Int. Cl.
*A01B 33/08* (2006.01)
*F16D 43/206* (2006.01)
*A01B 33/06* (2006.01)

(52) U.S. Cl.
CPC ............ *A01B 33/082* (2013.01); *A01B 33/06* (2013.01); *F16D 43/206* (2013.01)

(58) Field of Classification Search
CPC ..... A01B 33/027; A01B 33/028; A01B 33/06; A01B 33/082; A01B 1/10; A01B 1/16; F16D 43/206; F16D 43/00
See application file for complete search history.

(56) References Cited

U.S. PATENT DOCUMENTS

| | | | | |
|---|---|---|---|---|
| 2,366,626 A | * | 1/1945 | Cadwallader | A01B 33/082 172/51 |
| 2,669,826 A | * | 2/1954 | Watrous | A01D 34/63 56/13.4 |
| 2,969,133 A | * | 1/1961 | Langheck | F16D 43/206 192/56.57 |
| 3,026,979 A | * | 3/1962 | Moore | F01P 7/04 192/104 C |
| 3,141,312 A | * | 7/1964 | Howard | F16D 3/68 464/74 |
| 4,079,787 A | * | 3/1978 | Prat | A01B 33/082 172/123 |
| 4,354,564 A | * | 10/1982 | Watanabe | A01B 33/028 172/103 |
| 4,845,929 A | * | 7/1989 | Kawasaki | A01D 34/63 56/17.5 |

(Continued)

*Primary Examiner* — Jessica H Lutz
(74) *Attorney, Agent, or Firm* — Muncy, Geissler, Olds & Lowe, P.C.

(57) ABSTRACT

A driving head of an electric gardening machine includes a base, a driving assembly, a clutch member and a transmission member. The base defines an axial direction. The driving assembly is disposed on the base and includes a motor assembly and a driving rod. The motor assembly and the driving rod are in a rotation-connecting relationship. The clutch member is sleeved with the driving rod and slidable relative to the driving rod in the axial direction to be in a first position or a second position. The transmission member is rotatably connected to the base. The clutch member is in rotational interference with and engaged with the transmission member when the clutch member is located in the first position. The clutch member is free of rotational interference with the transmission member when the clutch member is located in the second position.

10 Claims, 5 Drawing Sheets

(56) References Cited

U.S. PATENT DOCUMENTS

| | | | | |
|---|---|---|---|---|
| 6,021,630 | A * | 2/2000 | Higashi | A01D 34/90 30/276 |
| 6,766,866 | B2 * | 7/2004 | Miyahara | A01B 33/028 171/137 |
| 7,493,696 | B2 * | 2/2009 | Suzuki | A01D 34/90 30/276 |
| 7,827,771 | B2 * | 11/2010 | Hishida | A01D 34/902 56/12.7 |
| 8,607,461 | B2 * | 12/2013 | Miyahara | A01D 34/90 30/276 |
| 10,264,725 | B2 * | 4/2019 | Guo | A01D 34/4166 |
| 2004/0007368 | A1 * | 1/2004 | Sugimoto | A01B 33/082 172/42 |
| 2004/0139814 | A1 * | 7/2004 | Ohta | F16H 3/083 74/335 |
| 2004/0142788 | A1 * | 7/2004 | Ohkubo | F16H 57/0482 475/317 |
| 2004/0148819 | A1 * | 8/2004 | Hanafusa | E01H 5/04 37/348 |
| 2004/0250649 | A1 * | 12/2004 | Oota | A01B 33/082 74/650 |
| 2004/0256120 | A1 * | 12/2004 | Oota | A01B 33/082 172/42 |
| 2009/0270210 | A1 * | 10/2009 | Firdaus | A01B 33/082 474/112 |
| 2017/0223886 | A1 * | 8/2017 | Parkey | A01B 1/065 |
| 2017/0290583 | A1 * | 10/2017 | Reed | A61B 17/07207 |

* cited by examiner

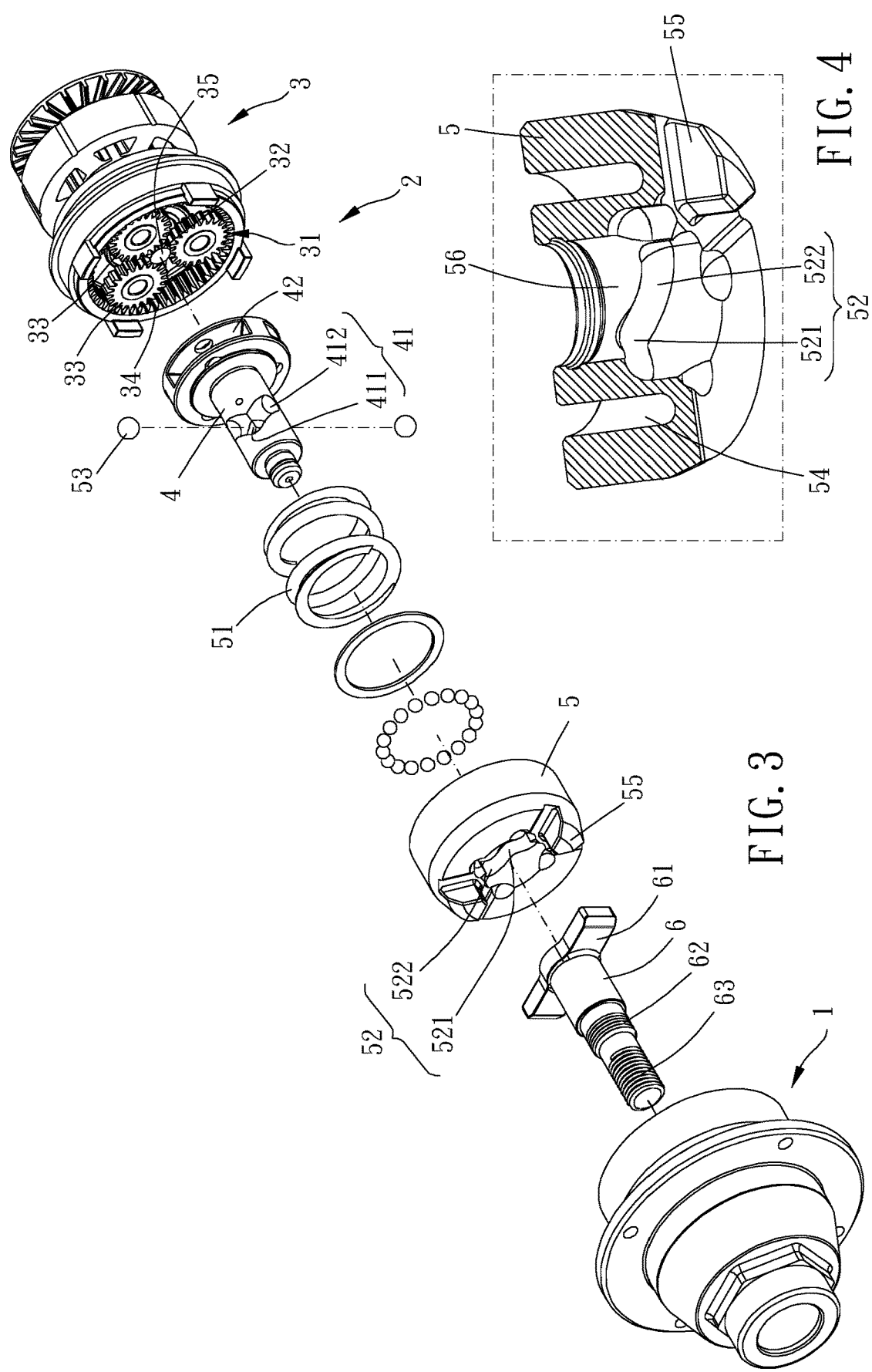

DRIVING HEAD OF AN ELECTRIC GARDENING MACHINE

BACKGROUND OF THE INVENTION

Field of the Invention

The present invention relates to a driving head of an electric gardening machine.

Description of the Prior Art

A conventional gardening machine (such as scarifier or lawnmower) includes a rod body, and one end of the rod body has a motor driving head and the other end of the rod body has a controller. The controller controls rotation of a tool head of the gardening machine. The motor driving head drives the tool head to rotate, and the tool head drives workpieces (such as cutters or scarifying members) disposed thereon to rotate for lawn mowing, stifling or scarifying.

However, the conventional gardening machine has some disadvantages. For example, the conventional gardening machine is driven by a motor, and the workpieces cannot be rotated when the workpieces are interfered by hard objects (such as stones or thick trunks), which causes that a shaft of the motor cannot rotate due to interference of the workpiece and the motor is easy to be damaged.

The present invention is, therefore, arisen to obviate or at least mitigate the above-mentioned disadvantages.

SUMMARY OF THE INVENTION

The main object of the present invention is to provide a driving head of an electric gardening machine which has a clutch member, a driving rod and a transmission member, and the clutch member is normally in cooperative rotatable connection with the driving rod and the transmission member; when the tool assembly connected to the transmission member is interfered to be non-rotatable relative to the base, the clutch member can be effectively disengaged from the transmission member and the driving rod can keep rotating without interference of the transmission member so as to avoid damage to a motor of the electric gardening machine.

To achieve the above and other objects, the present invention provides a driving head of an electric gardening machine, including a base, a driving assembly, a clutch member and a transmission member. The base defines an axial direction. The driving assembly is disposed on the base and includes a motor assembly and a driving rod. The motor assembly and the driving rod are in a rotation-connecting relationship. The driving rod includes at least one first groove which extends toward the axial direction and is disposed on a circumferential wall of the driving rod. The clutch member is sleeved with the driving rod and slidable relative to the driving rod in the axial direction to be in a first position or a second position. An elastic member is elastically abutted against and between the clutch member and the driving assembly and biases the clutch member toward the first position. The clutch member includes at least one second groove which extends toward the axial direction and is disposed on a circumferential wall of the clutch member. Between one of the at least one first groove and one of the at least one second groove is a restricting member movably received therewithin. The transmission member is rotatably connected to the base and has a tool assembly which is co-movable with the transmission member. The clutch member is in rotational interference with and engaged with the transmission member when the clutch member is located in the first position, and the clutch member is free of rotational interference with the transmission member when the clutch member is located in the second position. When the clutch member is located in the first position and the tool assembly is interfered to be non-rotatable relative to the base, and the transmission member cannot be rotated and the driving rod continues to rotate, the at least one first groove guides the restricting member to move relative to the at least one first groove and the at least one second groove, and the clutch member is moved to the second position and driven by the driving rod.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 3 is another breakdown drawing of a preferable embodiment of the present invention;

FIG. 4 is a partial cross-sectional view of a preferable embodiment of the present invention;

DETAILED DESCRIPTION OF THE PREFERRED EMBODIMENTS

Figure 1:
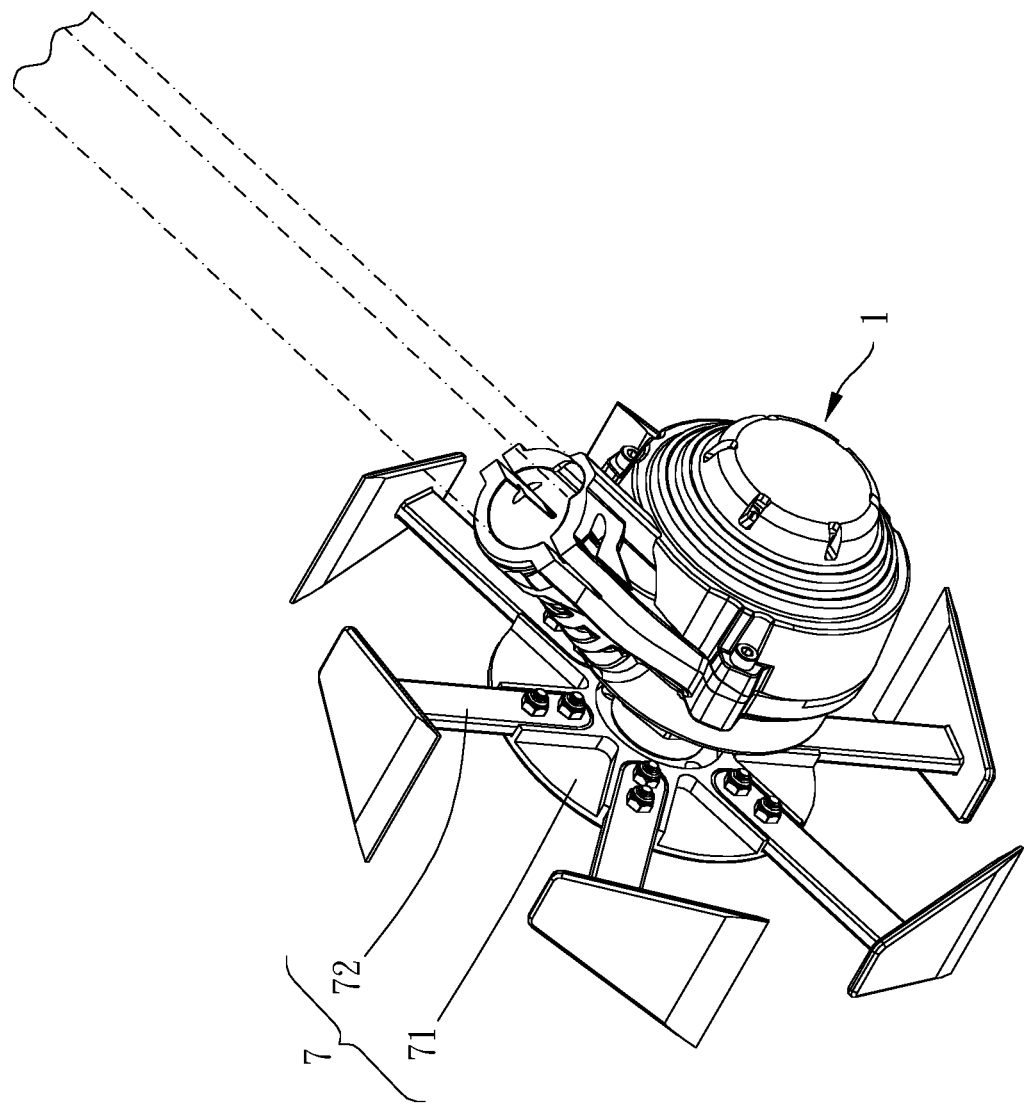
FIG. 1 is a stereogram of a preferable embodiment of the present invention.
Figure 2:
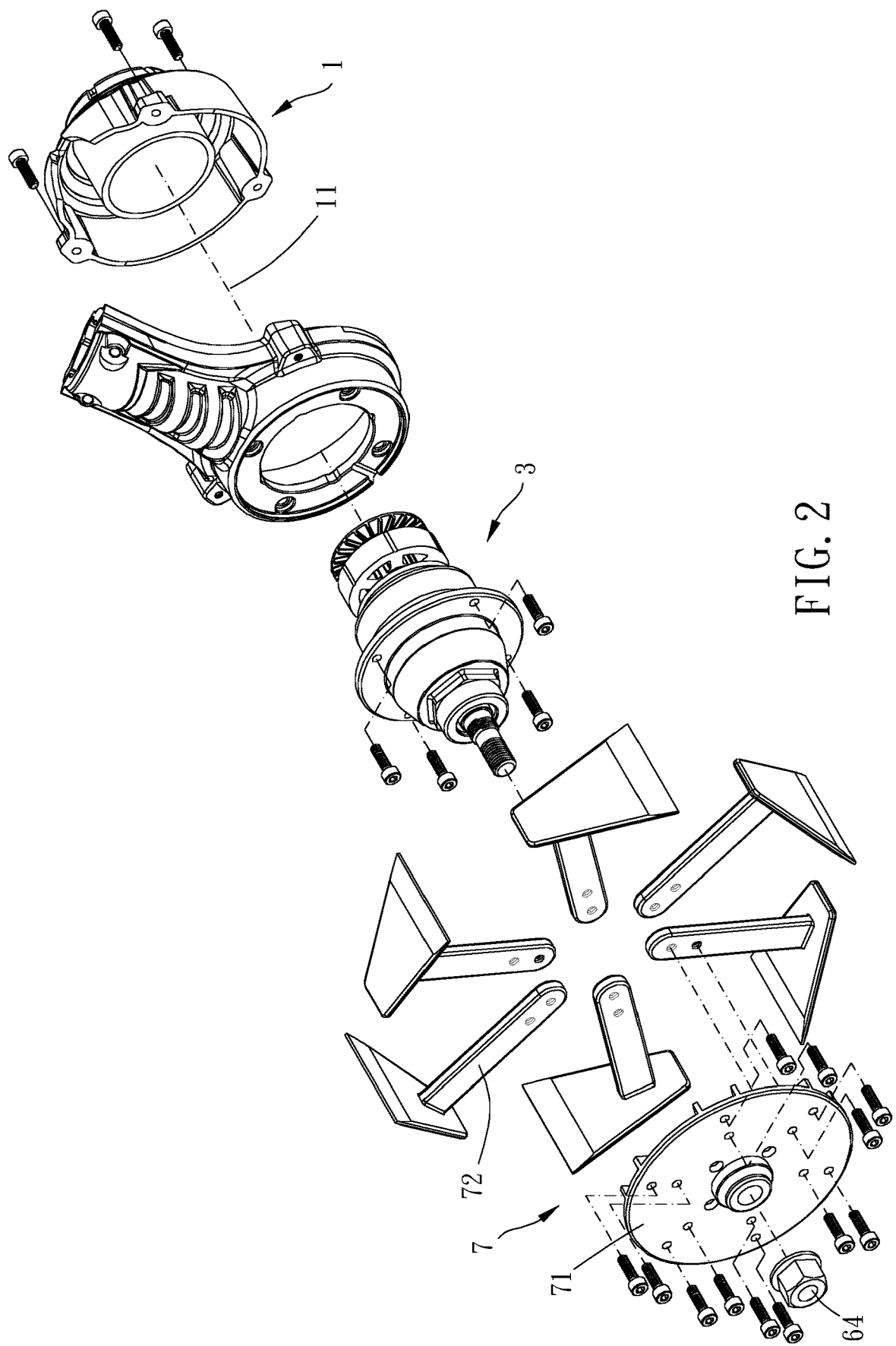
FIG. 2 is a breakdown drawing of a preferable embodiment of the present invention.

Please refer to FIGS. 1 to 6 for a preferable embodiment of the present invention. A driving head of an electric gardening machine of the present invention includes a base 1, a driving assembly 2, a clutch member 5 and a transmission member 6.

The base 1 defines an axial direction 11.

The driving assembly 2 is disposed on the base 1 and includes a motor assembly 3 and a driving rod 4. The motor assembly 3 and the driving rod 4 are in a rotation-connecting relationship, and the driving rod 4 includes at least one first groove 41 which extends toward the axial direction 11 and is disposed on a circumferential wall of the driving rod 4.

The clutch member 5 is sleeved with the driving rod 4 and slidable relative to the driving rod 4 in the axial direction 11 to be in a first position and a second position. An elastic member 51 is elastically abutted against and between the clutch member 5 and the driving assembly 2 and biases the clutch member 5 toward the first position. The clutch member 5 includes at least one second groove 52 which extends toward the axial direction 11 and is disposed on a circumferential wall of the clutch member 5. Between one of the at least one first groove 41 and one of the at least one second groove 52 is a restricting member 53 movably received therewithin. In this embodiment, respective numbers of the at least one first groove 41, the at least one second groove 52 and the restricting member 53 are two.

Figure 5:
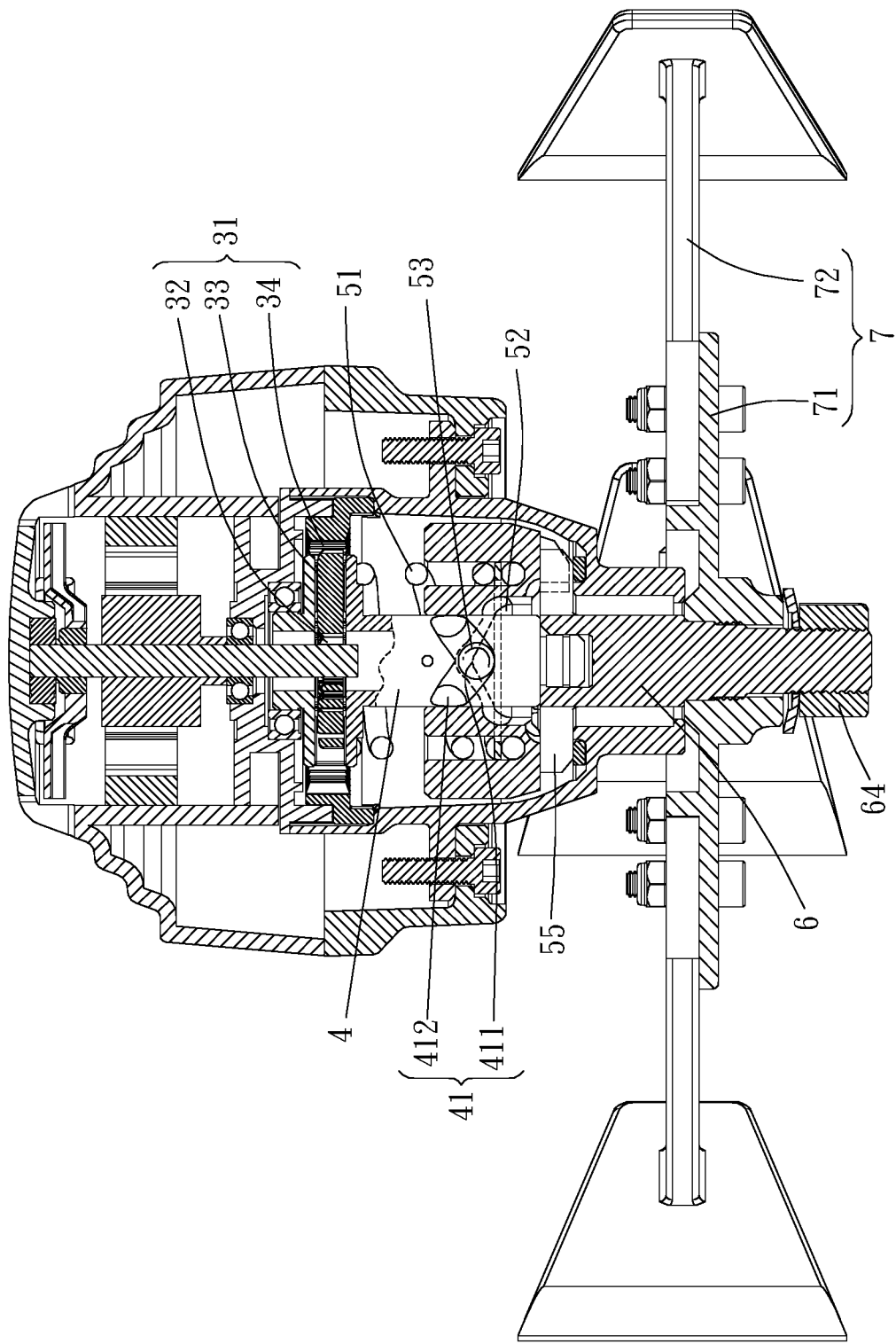
FIGS. 5 and 6 are operational schematic diagrams of a preferable embodiment of the present invention.
Figure 6:
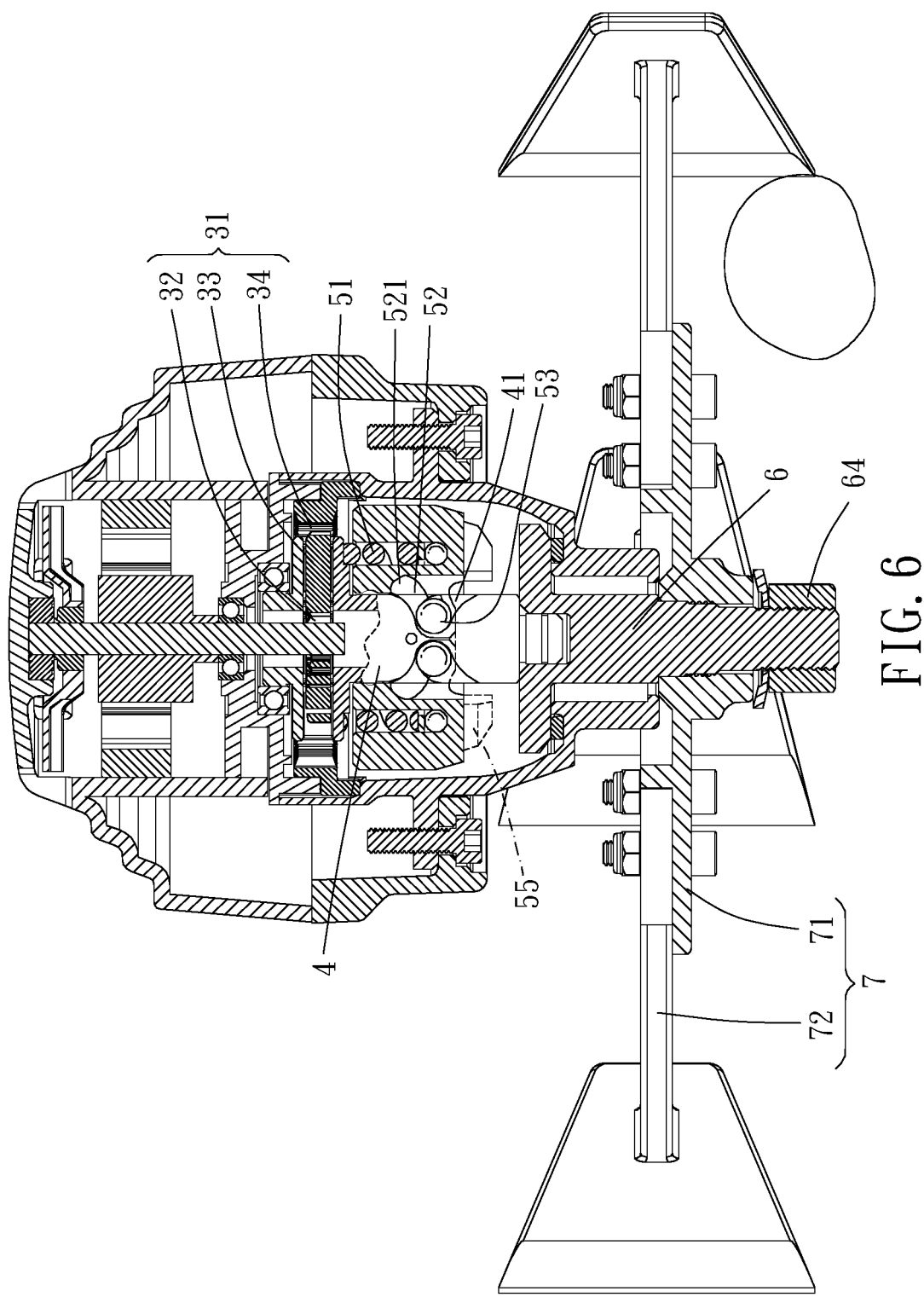

The transmission member 6 is rotatably connected to the base 1 and has a tool assembly 7 which is co-movable with the transmission member 6. The clutch member 5 is in rotational interference with and engaged with the transmission member 6 when the clutch member 5 is located in the first position (as shown in FIG. 5), and the clutch member 5 is free of rotational interference with the transmission member 6 when the clutch member 5 is located in the second position (as shown in FIG. 6).

When the clutch member 5 is located in the first position and the tool assembly 7 is interfered to be non-rotatable relative to the base 1 (such as the tool assembly 7 impacts on stones or trunks), and the transmission member 6 cannot be rotated and the driving rod 4 continues to rotate, the at least one first groove 41 guides the restricting member 53 to move relative to the at least one first groove 41 and the at least one second groove 52, and the clutch member 5 is moved to the second position and driven by the driving rod 4. Therefore, with cooperation of the at least one first groove 41, the restricting member 53 and the at least one second groove 52, the clutch member 5 can disengageably slip to be free of interference with the transmission member 6 so that the driving rod 4 can keep rotating without interference of the transmission member 6 to avoid damage to the motor assembly 3.

Specifically, the motor assembly 3 includes a transmission gear assembly 31, an end of the driving rod 4 away from the clutch member 5 has a driving plate 42 disposed integrally thereon, and the transmission gear assembly 31 is rotatably connected with the driving plate 42 to drive the driving plate 42. The transmission gear assembly 31 includes an active gear 32, a plurality of planet gears 33 and an annular gear 34. The active gear 32 is sleeved to a shaft 35 of the motor assembly 3, and the annular gear 34 is fixedly disposed on the base 1. The driving plate 42 is rotatably disposed within the annular gear 34, and the annular gear 34 surrounds the active gear 32 and the plurality of planet gears 33. The active gear 32 is engaged with the plurality of planet gears 33, and the plurality of planet gears 33 are engaged with the annular gear 34. The plurality of planet gears 33 are pivotally disposed within the driving plate 42, and the plurality of planet gears 33 move around the active gear 32 and drive the driving plate 42 to rotate when the active gear 32 is rotated so as to decelerate.

Preferably, the clutch member 5 has an annular groove 54 open in a direction toward the driving plate 42, and the elastic member 51 is received within the annular groove 54 and elastically abutted against and between the driving plate 42 and a bottom wall of the annular groove 54. When the tool assembly 7 is free of rotational interference, the elastic member 51 elastically biases the clutch member 5 toward the first position so that the transmission member 6 is in rotational interference with the clutch member 5 and drives the tool assembly 7 to rotate.

Moreover, the clutch member 5 has at least one engaging portion 55 protruding in a direction toward the transmission member 6 (in this embodiment, there are two of said engaging portions 55), and the transmission member 6 includes two arm portions 61 disposed radially thereon. When the clutch member 5 is located in the first position, each of the at least one engaging portion 55 is in rotational interference with one of the two arm portions 61 so as to drive the transmission member 6 to rotate.

Furthermore, the clutch member 5 further has a through hole 56 disposed therethrough along the axial direction 11, and the clutch member 5 is sleeved to the driving rod 4 via the through hole 56. Two of said second grooves 52 are disposed on a circumferential wall of the through hole 56, two of said first grooves 41 are disposed on an outer circumferential wall of the driving rod 4, and two of said restricting members 53 are engaging balls. In this embodiment, each of the two of said first grooves 41 includes a first end 411 toward the transmission member 6 and a second end 412 away from the transmission member 6, and each of the two of said second grooves 52 includes a third end 521 toward the motor assembly 3 and a fourth end 522 away from the motor assembly 3. When the clutch member 5 is located in the first position, the two of said restricting members 53 are respectively located between the first end 411 of one of the two of said first grooves 41 and the third end 521 of one of the two of said second grooves 52; when the clutch member 5 is interfered by the transmission member 6 to be non-rotatable and the driving rod 4 continues to rotate, respective one of the two of said restricting members 53 moves from the first end 411 toward the second end 412 of one of the two of said first grooves 41 and moves from the third end 521 toward the fourth end 522 of one of the two of said second grooves 52, and the clutch member 5 is moved toward the second position so that the two of said engaging portions 55 of the clutch member 5 are rapidly disengaged from the two arm portions 61.

Preferably, each of the two of said first grooves 41 and each of the two of said second grooves 52 are V-shaped, and each of the two of said first grooves 41 has two of said second ends 412 and each of the two of said second grooves 52 has two of said fourth ends 522 so that the clutch member 5 can be free of rotational interference with the transmission member 6 when the driving rod 4 rotates forwardly or reversely.

The transmission member 6 further includes a first threaded portion 62 and a second threaded portion 63. The second threaded portion 63 is disposed on an end of the transmission member 6 away from the motor assembly 3, the tool assembly 7 is screwed on the first threaded portion 62, and a fastener 64 is screwed on the second threaded portion 63 and abutted against the tool assembly 7 so as to restrict the tool assembly 7 to the transmission member 6. In this embodiment, the tool assembly 7 includes a connecting member 71 and at least one workpiece 72 (the at least one workpiece 72 is a scarifying member in this embodiment), the connecting member 71 is screwed on the first threaded portion 62, and the at least one workpiece 72 is assembled with the connecting member 71. The first threaded portion 62 is a right-hand thread and the second threaded portion 63 is a left-hand thread. When the transmission member 6 rotates, the fastener 64 and the connecting member 71 are tightly close to each other so as to avoid loosening of the fastener 64 and the connecting member 71 from the transmission member 6.

In summary, the clutch member is normally in cooperative rotatable connection with the driving rod and the transmission member; when the tool assembly connected to the transmission member is interfered to be non-rotatable relative to the base, the clutch member can be effectively disengaged from the transmission member and the driving rod can keep rotating without interference of the transmission member so as to avoid damage to the motor assembly.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A driving head of an electric gardening machine,
a base, defining an axial direction;
a driving assembly, disposed on the base, including a motor assembly and a driving rod, the motor assembly and the driving rod being in a rotation-connecting relationship, the driving rod including at least one first groove which extends toward the axial direction and is disposed on a circumferential wall of the driving rod;

a clutch member, being sleeved with the driving rod and slidable relative to the driving rod in the axial direction to be in a first position or a second position, an elastic member being elastically abutted against and between the clutch member and the driving assembly and biasing the clutch member toward the first position, the clutch member including at least one second groove which extends toward the axial direction and is disposed on a circumferential wall of the clutch member, between one of the at least one first groove and one of the at least one second groove being a restricting member movably received therewithin;

a transmission member, being rotatably connected to the base, having a tool assembly which is co-movable with the transmission member, the clutch member being in rotational interference with and engaged with the transmission member when the clutch member is located in the first position, the clutch member being free of rotational interference with the transmission member when the clutch member is located in the second position;

wherein when the clutch member is located in the first position and the tool assembly is interfered to be non-rotatable relative to the base, and the transmission member cannot be rotated and the driving rod continues to rotate, the at least one first groove guides the restricting member to move relative to the at least one first groove and the at least one second groove, and the clutch member is moved to the second position and driven by the driving rod.

2. The driving head of an electric gardening machine of claim 1, wherein the motor assembly includes a transmission gear assembly, an end of the driving rod away from the clutch member has a driving plate disposed integrally thereon, and the transmission gear assembly is rotatably connected with the driving plate to drive the driving plate.

3. The driving head of an electric gardening machine of claim 2, wherein the transmission gear assembly includes an active gear, a plurality of planet gears and an annular gear, the active gear is sleeved to a shaft of the motor assembly, the annular gear is fixedly disposed on the base, the driving plate is rotatably disposed within the annular gear, the annular gear surrounds the active gear and the plurality of planet gears, the active gear is engaged with the plurality of planet gears, the plurality of planet gears are engaged with the annular gear, the plurality of planet gears are pivotally disposed within the driving plate, and the plurality of planet gears move around the active gear and drive the driving plate to rotate when the active gear is rotated.

4. The driving head of an electric gardening machine of claim 2, wherein the clutch member has an annular groove open in a direction toward the driving plate, and the elastic member is received within the annular groove and elastically abutted against and between the driving plate and a bottom wall of the annular groove.

5. The driving head of an electric gardening machine of claim 1, wherein the clutch member has at least one engaging portion protruding in a direction toward the transmission member, the transmission member includes two arm portions disposed radially thereon, and each of the at least one engaging portion is in rotational interference with one of the two arm portions when the clutch member is located in the first position.

6. The driving head of an electric gardening machine of claim 1, wherein the clutch member has a through hole disposed therethrough along the axial direction, and the clutch member is sleeved to the driving rod via the through hole, the at least one second groove is disposed on a circumferential wall of the through hole, the at least one first groove is disposed on an outer circumferential wall of the driving rod, and the restricting member is an engaging ball.

7. The driving head of an electric gardening machine of claim 6, wherein each of the at least one first groove includes a first end toward the transmission member and a second end away from the transmission member, each of the at least one second groove includes a third end toward the motor assembly and a fourth end away from the motor assembly, when the clutch member is located in the first position, the restricting member is located between the first end of one of the at least one first groove and the third end of one of the at least one second groove; when the clutch member is interfered by the transmission member to be non-rotatable and the driving rod continues to rotate, the restricting member is moved from the first end toward the second end of one of the at least one first groove and moved from the third end toward the fourth end of one of the at least one second groove, and the clutch member is moved toward the second position.

8. The driving head of an electric gardening machine of claim 7, wherein each of the at least one first groove and each of the at least one second groove are V-shaped, and each of the at least one first groove has two of said second ends and each of the at least one second groove has two of said fourth ends.

9. The driving head of an electric gardening machine of claim 1, wherein the transmission member includes a first threaded portion and a second threaded portion, the second threaded portion is disposed on an end of the transmission member away from the motor assembly, the tool assembly is screwed on the first threaded portion, and a fastener is screwed on the second threaded portion and abutted against the tool assembly.

10. The driving head of an electric gardening machine of claim 9, wherein the tool assembly includes a connecting member and at least one workpiece, the connecting member is screwed on the first threaded portion, the at least one workpiece is assembled with the connecting member, and the first threaded portion is a right-hand thread and the second threaded portion is a left-hand thread.

* * * * *